United States Patent [19]

Lausberg et al.

[11] Patent Number: 4,791,158
[45] Date of Patent: Dec. 13, 1988

[54] THERMOPLASTIC MOLDING MATERIALS CONTAINING A POLYESTER AND A POLYCARBONATE

[75] Inventors: Dietrich Lausberg, Ludwigshafen; Graham E. McKee, Weinheim; Christof Taubitz, Wachenheim; Georg Wassmuth, Ludwigshafen; Manfred Knoll, Wachenheim, all of Fed. Rep. of Germany

[73] Assignee: BASF Aktiengesellschaft, Rheinland-Pfalz, Fed. Rep. of Germany

[21] Appl. No.: 72,031

[22] Filed: Jul. 10, 1987

[30] Foreign Application Priority Data

Aug. 9, 1986 [DE] Fed. Rep. of Germany ....... 3627131

[51] Int. Cl.$^4$ .................... C08K 5/42; C08L 69/00
[52] U.S. Cl. .................... 524/156; 524/157; 524/158; 524/166; 524/537; 525/439
[58] Field of Search ............. 524/157, 158, 160, 161, 524/166, 537, 156; 525/439

[56] References Cited

U.S. PATENT DOCUMENTS

| | | | |
|---|---|---|---|
| 3,314,920 | 4/1967 | Sakurai | 524/160 |
| 3,702,350 | 11/1972 | Kimura | 524/166 |
| 3,864,428 | 2/1975 | Nakamura | 260/873 |
| 4,172,859 | 10/1979 | Epstein | 428/402 |
| 4,257,937 | 3/1981 | Cohen | 524/445 |
| 4,264,487 | 4/1981 | Fromuth | 525/68 |
| 4,380,598 | 4/1983 | Robeson | 524/157 |
| 4,533,680 | 8/1985 | Kasuga | 524/537 |
| 4,677,148 | 6/1987 | Chung | 524/537 |

FOREIGN PATENT DOCUMENTS

| | | |
|---|---|---|
| A114288 | 8/1984 | European Pat. Off. . |
| 3227028 | 1/1984 | Fed. Rep. of Germany . |
| 2118193 | 10/1983 | United Kingdom . |

*Primary Examiner*—John C. Bleutge
*Assistant Examiner*—David Buttner
*Attorney, Agent, or Firm*—Oblon, Fisher, Spivak, McClelland & Maier

[57] ABSTRACT

Thermoplastic molding materials contain, as essential components, (A) from 10 to 89.99% by weight of a polyester,
(B) from 10 to 89.99% by weight of a polycarbonate and
(C$_1$) from 0.01 to 1% by weight of a low molecular weight organic compound of not more than 70 carbon atoms which contains $(-SO_3)_mQ$ groups where Q is hydrogen, NH$_4$ or an alkali or alkaline earth metal and m is an integer equal to the valency of Q, and/or
(C$_2$) from 0.01 to 30% by weight of a polymer containing sulfo groups and having a weight average molecular weight of not less than 1000, and, as a further component, (D) from 0 to 30% by weight of a rubber impact modifier.

22 Claims, No Drawings

THERMOPLASTIC MOLDING MATERIALS CONTAINING A POLYESTER AND A POLYCARBONATE

The present invention relates to a thermoplastic molding material containing, as essential components,
(A) from 10 to 89.99% by weight of a polyester,
(B) from 10 to 89.99% by weight of a polycarbonate,
(C$_1$) from 0.01 to 1% by weight of a low molecular weight organic compound of not more than 70 carbon atoms which contains ($-SO_3$)$_m$Q groups where Q is hydrogen, $NH_4^+$ or an alkali or alkaline earth metal and m is an integer equal to the valency of Q, and/or
(C$_2$) from 0.01 to 30% by weight of a polymer containing sulfo groups and having a weight average molecular weight of not less than 1000,
and, as a further component,
(D) from 0 to 30% by weight of a rubber impact modifier.

The present invention furthermore relates to the use of the novel molding materials for the production of moldings, and to the moldings obtainable therefrom.

Blends of polyesters and polycarbonates are disclosed in DE-A-24 17 002. They have better mechanical properties than pure polyesters.

The addition of polymers having a glass transition temperature of less than 0° C., for example graft rubbers based on acrylates, ethylene or butadiene, to polyester/polycarbonate blends is disclosed in EP-A-No. 25 920, WO No. 80/972, EP-A-No. 114 288, DE-A-No. 23 43 609, U.S. Pat. No. 4,172,859, DE-A-No. 33 10 754 and DE-A-No. 32 27 028.

All these molding materials have a satisfactory impact strength, but their natural color (yellow) is unacceptable for some purposes and, furthermore, the heat distortion resistance is unsatisfactory.

It is an object of the present invention to provide thermoplastic molding materials which are based on polyesters and polycarbonates, possess not only good impact strength at low temperatures but also good heat distortion resistance, and are white or have only a pale coloration.

We have found that this object is achieved, according to the invention, by the thermoplastic molding materials defined at the outset.

The polyesters present in the novel molding materials are known per se and are described in the literature. Preferably used polyesters are those which contain an aromatic ring in the main chain.

The aromatic ring may furthermore be substituted, for example by halogen, such as chlorine or bromine, and by C$_1$-C$_4$-alkyl, such as methyl, ethyl, isopropyl, n-propyl, isobutyl, n-butyl or tert-butyl.

The polyesters can be prepared by reacting dicarboxylic acids, their esters or other ester-forming derivatives with dihydroxy compounds in a conventional manner.

Examples of suitable dicarboxylic acids are aliphatic and aromatic dicarboxylic acids, which may also be used in the form of a mixture. Naphthalenedicarboxylic acids, terephthalic acid, isophthalic acid, adipic acid, azelaic acid, sebacic acid, dodecanoic acid and cyclohexanedicarboxylic acids, mixtures of these carboxylic acids and ester-forming derivatives of these may be mentioned here merely by way of example.

Preferably used dihydroxy compounds are diols of 2 to 6 carbon atoms, particularly preferably ethylene glycol, butane-1,4-diol, butene-1,4-diol and hexane-1,6-diol; however, it is also possible to use hexane-1,4-diol, cyclohexane-1,4-diol, 1,4-di-(hydroxymethyl)-cyclohexane, bisphenol A, neopentylglycol, mixtures of these diols and their ester-forming derivatives.

Polyesters obtained from terephthalic acid and a C$_2$-C$_6$-diol component, such as polyethylene terephthalate or polybutylene terephthalate, are particularly preferred.

The relative viscosity $\eta_{spec}/c$ of the polyester, measured on a 0.5% strength solution in a phenol/o-dichlorobenzene mixture (weight ratio 3:2) at 25° C., is in general from 1.2 to 1.8.

The amount of polyester (A) in the novel molding materials is from 10 to 89.99, preferably fTom 15 to 80, in particular from 20 to 75, % by weight, based on the total weight of the molding materials.

The polycarbonates (B) are likewise known per se and are described in the literature.

These polycarbonates are preferably prepared by reacting a carboxylic acid derivative, such as phosgene or diphenyl carbonate, with a diphenol. In principle, any diphenol can be used, as stated in, for example, the monograph by H. Schnell, Chemistry and Physics of Polycarbonates (Interscience Publishers, 1964) and U.S. Pat. No. 2,999,835 and DE-A-No. 22 48 817. Dihydroxy diphenyl, di-(hydroxyphenyl)-alkanes and di-(hydroxyphenyl) ethers and mixtures of these are particularly preferred diphenols.

A particularly preferred diphenol is 2,2-di-(4'-hydroxyphenyl)-propane (bisphenol A). This can also be used as a mixture with other diphenols, such as 2,2-di-(4'-hydroxyphenyl)-pentane, 2,6-dihydroxynaphthalene, 4,4'-dihydroxydiphenyl sulfone, di-(4-hydroxyphenyl) ether, di-(4-hydroxyphenyl) sulfite, di-(4-hydroxyphenyl)-methane, 1,1-di-(4'-hydroxyphenyl)-ethane or 4,4-di-hydroxydiphenyl. The amount of bisphenol A in mixtures of this type is in general from 70 to 98% by weight.

Processes for the preparation of such polycarbonates are known per se and are described in, for example, U.S. Pat. No.2,999,835 and DE-A-No. 22 48 817, which have been mentioned above, and DE-A-13 00 266 and DE-A-14 95 730.

The relative viscosity of polycarbonate (B) is in general from 1.2 to 1.5, preferably from 1.28 to 1.40, dl/g, measured in 0.5% strength by weight solution in dichloromethane at 25° C.

The amount of polycarbonates (B) is from 10 to 89.99, preferably from 15 to 78, in particular from 20 to 65, % by weight, based on the total weight of components (A) to (D).

The novel molding materials contain, as an essential component, one of the components (C$_1$) and (C$_2$) as defined at the outset.

In principle, it is also possible to use mixtures of components (C$_1$) and (C$_2$), but the use of only one component has in general been found to be particularly advantageous.

Component (C$_1$) is a low molecular weight organic compound of not more than 70 carbon atoms which contains ($-SO_3$)$_m$Q groups where Q is hydrogen, $NH_4^{30}$ or an alkali metal or an alkaline earth metal cation and m is an integer equal to the valency of Q. The molecular weight of component (C$_1$) is advantageously not more than 1000.

The amount of component ($C_1$) is from 0.01 to 1, preferably from 0.02 to 0.5% by weight, based on the total weight of components (A) to (D).

Sulfonic acids which contain one or more sulfo groups and may also contain carboxyl groups may be mentioned here as a first group of such compounds.

Preferred compounds of this type have the general structures

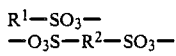

$R^1$—$SO_3$—
—$O_3S$—$R^2$—$SO_3$—

$R^3$—CH—$R^4$—$SO_3$—
   |
   COO— where $R^1$, $R^2$ and $R^3$ are each a monovalent or divalent alkyl, alkenyl or aryl group of not more than 30 carbon atoms and $R^4$ is likewise a radical of these types or a chemical bond, and these groups may furthermore be substituted or may contain further functional groups or substituents such as —O—$CH_2$—$CH_2$— or —O—$CH_2$—$CH_2$—$CH_2$—$CH_2$— units, carboxyl groups or halogen substituents.

Particularly preferred examples are $C_9$-$C_{22}$-alkylsulfonic acids, such as decylsulfonic acid, dodecylsulfonic acid or octadecylsulfonic acid, unsaturated $C_9$-$C_{22}$-alkenesulfonic acids, ie. unsaturated sulfonated fatty acids, such as linolenic acid, $C_8$-$C_{25}$-hydroxyalkenesulfonic acids, $C_6$-$C_{15}$-perfluoroalkanesulfonic acids, such as perfluorooctanesulfonic acid, derivatives of sulfosuccinic acid, $C_1$-$C_{25}$-alkylbenzenesulfonic acids and $C_1$-$C_{25}$-alkylnaphthalenesulfonic acids, such as diisobutylnaphthalene-1-sulfonic acids, and the corresponding unsubstituted acids.

As examples of compounds containing —O—$CH_2$—$CH_2$— units in the molecule, only n—$C_{12}H_{25}$—(O—$CH_2$—$CH_2$)$_6$—$SO_3H$ and

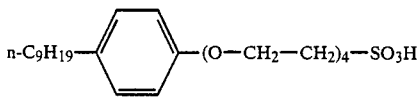

n-$C_9H_{19}$—⟨aryl⟩—(O—$CH_2$—$CH_2$)$_4$—$SO_3H$ are mentioned here.

A second group of compounds which are used as component (C) comprises organic sulfuric acid half esters, preferably those of the general formulae $R^1$—O—$SO_3H$
$HO_3SO$—$R^2$—$OSO_3H$ $R^3$—CH—$R^4$—$OSO_3H$
   |
   COOH where $R^1$, $R^2$, $R^3$ and $R^4$ have the meanings defined above.

Examples of these are $C_5$-$C_{30}$-alkyl hydrogen sulfates, $C_5$-$C_{30}$-alkenyl hydrogen sulfates, or oligoethylene oxide hydrogen sulfates containing from 2 to 20 ethylene oxide units, oligo-hydrogen sulfates containing from 2 to 12 butane-1,4-diol units, unsubstituted or $C_1$-$C_{12}$-alkyl-substituted aryl hydrogen sulfates, and hydrogen sulfates which are obtainable by esterification of $H_2SO_4$ with alcohols or phenols which may have up to 10 —O—$CH_2$—$CH_2$— units in the chain.

Butyl hydrogen sulfate, ethylhexyl hydrogen sulfate, hexadecen-1-ol hydrogen sulfate, $C_{15}H_{31}$—(O—$CH_2$—$CH_2$)$_3$—O—$SO_3H$, $C_{12}H_{25}$—(O—$CH_2$—$CH_2CH_2CH_2$)$_2$—[$OSO_3H$, isooctylphenol hydrogen sulfate and $C_9H_{13}$—$C_6H_4$—[O—$CH_2$—$CH_2$]$_4$—$SO_3H$ are particularly preferred.

The sulfonic acids and hydrogen sulfates may also be partially neutralized by metal cations or ammonium ions, but the unneutralized compounds are preferably used.

Processes for the preparation of the abovementioned sulfonic acids and organic sulfuric acid half esters, and the compounds themselves, are known per se and are described in the literature, so that no further information is required here.

Although preferred groups of compounds have been described above as component (C), it must be emphasized that in principle any compound which has an $SO_3H$ or $OSO_3H$ group and is not completely incompatible with the other components of the molding materials can be used.

Component ($C_2$) is a polymer which contains sulfo groups and has a weight average molecular weight of not less than 1000, preferably from 2000 to 100,000, in particular from 10,000 to 500,000.

Such polymers can be obtained, for example, by polymer-analogous reaction of polymers with incorporation of sulfo groups. Reactions of this type are known per se and are described in, for example, E. Fettes, Chemical Reactions of Polymers, Interscience Publishers, or C. Carraher, Modification of Polymers in Polymer Science and Technology, vol. 21 (1983). Products of this type are also obtainable as described in U.S. Pat. No. 3,870,841.

In general, sulfo groups are incorporated in from 0.1 to 50, preferably from 0.1 to 15, % by weight of the repeating monomer units in these products.

Examples of these are sulfonated polystyrene, which may be used in crosslinked form but is preferably employed in uncrosslinked form, and sulfonated rubbers, for example those of the type described for component (D), in particular ethylene/propylene (EP) or ethylene/propylene/diene (EPDM) rubbers and sulfonated polycondensates.

Polymers (C) are also obtainable by polycondensation of sulfo-containing monomers, for example of diols, as described for the preparation of the polycarbonates (B). The polycondensation conditions are known per se and are described in the literature, so that no further information is required here.

Polysulfones which contain units of di-(4-hydroxyphenyl) sulfone with a sulfonated aromatic ring may also be mentioned here.

In the polymerization of the sulfo-containing monomers, it is preferable to use other comonomers which do not carry any sulfo groups, so that copolymers are obtained in which from 0.1 to 50, preferably from 0.5 to 10, % of the repeating monomer units possess sulfo groups.

Styrene derivatives, eg. p-styrenesulfonic acid, and monomers which are derived from acrylates or methacrylates, such as 2-sulfoethyl methacrylate or 2-acrylamido-2-methylpropenesulfonic acid, may be mentioned as sulfo-containing monomers for this version.

Examples of comonomers without sulfo groups are styrene, α-methylstyrene, p-methylstyrene, acrylates, methacrylates, acrylonitrile, methacrylonitrile, acrylamide and methacrylamide as well as olefins, such as ethene or propene, and dienes, eg. butadiene.

The amount of polymer (C) in the novel molding materials is from 0.01 to 30% by weight, polymers having a glass transition temperature of more than 40° C., preferably being used in amounts of from 0.1 to 10% by weight, and those having a glass transition temperature of less than 20° C. being used in amounts of from 1 to 30% by weight.

From the above description of component (C), it is evident that it can also serve as a rubber impact modifier, so that the amount of component (D) can be reduced accordingly.

The novel thermoplastic molding materials contain, as component (D), from 0 to 30, preferably from 2 to 25, in particular from 5 to 15, % by weight, based on the total weight of components (A) to (D), of an elastomer (rubber) which increases the impact strength and has a glass transition temperature of, preferably, less than $-30°$ C., in particular less than $-40°$ C..

Very generally, these are copolymers which preferably consist of two or more of the following monomers, ethylene, propylene, butadiene, isobutene, isoprene, chloroprene, vinyl acetate, styrene, acrylonitrile and acrylates or methacrylates where the alcohol component is of 1 to 18 carbon atoms.

Polymers of this type are described in, for example, Houben-Weyl, Methoden der organischen Chemie, vol. 14/1 (Georg-Thieme-Verlag, Stuttgart, 1961), pages 392-406 and in the monograph by C. B. Bucknall, Toughened Plastics (Applied Science Publishers, London, 1977).

A few preferred types of such elastomers are described below.

A first preferred group comprises the ethylene/propylene (EPM) and ethylene/propylene/diene (EPDM) rubbers, which preferably have a ratio of ethylene radicals to propylene radicals of from 20:80 to 65:35.

The Mooney viscosities (MLI+4/100° C.) of such uncrosslinked EPM and EPDM rubbers (gel contents generally less than 1% by weight) are preferably from 25 to 100, in particular from 35 to 90 (measured using the large rotor after an operating time of 4 minutes at 100° C. according to DIN 53,523).

EPM rubbers generally have virtually no double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadienes, cyclohexadienes, cyclooctadiene and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo(5.2.1.0.2.6)-3,8-decadiene, and mixtures of these. Hexa-1,5-diene, ethylidene-2-norbornene and dicyclopentadiene are preferred. The diene content of the EPDM rubbers is preferably from 0.5 to 10, in particular from 1 to 8, % by weight, based on the total weight of the rubber.

EPM and EPDM rubbers can also be grafted with reactive carboxylic acids or their derivatives. Only acrylic acid, methacrylic acid and their derivatives and maleic anhydride are mentioned here.

Another group of preferred rubbers comprises copolymers of ethylene with acrylic acid and/or methacrylic acid and/or their esters, in particular those which additionally contain epoxide groups. These epoxide groups are preferably incorporated in the rubber by adding to the monomer mixture epoxide-containing monomers of the general formula II or III

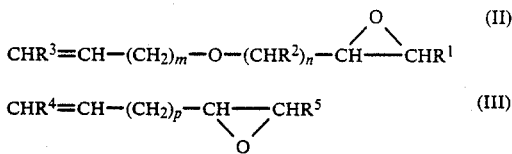

where $R^1$, $R^2$, $R^3$, $R^4$ and $R^5$ are each hydrogen or alkyl of 1 to 6 carbon atoms, m is an integer from 0 to 20, n is an integer from 0 to 10 and p is an integer from 0 to 5.

$R^1$, $R^2$ and $R^3$ are each preferably hydrogen, m is preferably 0 or 1 and n is preferably 1. The corresponding compounds are allyl glycidyl ether or vinyl glycidyl ether.

Preferred compounds of the formula II are epoxide-containing esters of acrylic acid and/or methacrylic acid, of which glycidyl acrylate and glycidyl methacrylate are particularly preferred.

The ethylene content of the copolymers is in general from 50 to 98% by weight, and the proportion of epoxide-containing monomers and that of the acrylate and/or methacrylate ranges in each case from 1 to 49% by weight.

Particularly preferred copolymers (D) are those consisting of from 50 to 98, in particular from 60 to 95, % by weight of ethylene, from 1 to 40, in particular from 3 to 20, % by weight of glycidyl acrylate and/or glycidyl methacrylate and from 1 to 45, in particular from 10 to 35, % by weight of n-butyl acrylate and/or 2-ethylhexyl acrylate.

Other preferred esters of acrylic and/or methacrylic acid are the methyl, ethyl, propyl, isobutyl and tert-butyl esters.

Vinyl esters and vinyl ethers too can be used as comonomers.

The ethylene copolymers described above can be prepared by a conventional method, for example by random copolymerization. Appropriate processes are described in the literature.

The melt flow index of the ethylene copolymers is in general from 1 to 80 g/10 min (measured at 190° C. and under a load of 2.16 kg).

Other preferred elastomers (rubbers) (D) are graft copolymers with butadiene, butadiene/styrene, butadiene/acrylonitrile and acrylates, as described in, for example, DE-A-16 94 173 and DE-A-23 48 377.

Particular examples of these are the acrylonitrile/butadiene/styrene (ABS) polymers, as described in DE-A-No. 20 35 390, DE-A-22 48 242 and EP-A-No. 22 216, the polymers stated in the last-mentioned Application being particularly preferred.

Other suitable rubbers (D) are graft polymers of from
25 to 98% by weight of an acrylate rubber having a glass transition temperature of less than $-20°$ C., as the grafting base (base polymer) and
from 2 to 75% by weight of a copolymerizable ethylenically unsaturated monomer whose homopolymers and copolymers have a glass transition temperature of more than 25° C., as the grafted shell.

The grafting bases are acrylate or methacrylate rubbers, and up to 40% by weight of other comonomers may be present. The $C_1$-$C_8$-esters of acrylic acid or methacrylic acid and their halogenated derivatives, as well as aromatic acrylates and mixtures of these, are preferred. Examples of comonomers in the grafting base are acrylonitrile, methacrylonitrile, styrene, α-methylstyrene, acrylamides, methacrylamides and vinyl-$C_1$-$C_6$-alkyl ethers.

The grafting base may be uncrosslinked or partially or completely crosslinked. Crosslinking is effected, for example, by copolymerization of 0.02 to 5, in particular from 0.05 to 2, % by weight of a crosslinking monomer containing more than one double bond. Suitable crosslinking monomers are described in, for example, DE-A-27 26 256 and EP-A-50 265.

Preferred crosslinking monomers are triallyl cyanurate, triallyl isocyanurate, triacryloylhexahydro-s-triazine and triallylbenzenes.

If the crosslinking monomers contain more than two polymerizable double bonds, it is advantageous to restrict the amount of these monomers to not more than 1% by weight, based on the grafting base.

Particularly preferred grafting bases are emulsion polymers having a gel content of more than 60% by weight (determined in dimethylformamide at 25° C. according to M. Hoffmann, H. Krömer and R. Kuhn, Polymeranalytik, Georg-Thieme-Verlag, Stuttgart, 1977).

Other suitable grafting bases are acrylate rubbers having a diene core, as described in, for exanple, EP-A-No. 50 262.

Particularly suitable graft monomers are styrene, α-methylstyrene, acrylonitrile, methacrylonitrile and methyl methacrylate and mixtures of these, in particular those of styrene and acrylonitrile in a weight ratio of from 90:10 to 50:50.

The grafting yield, ie. the quotient of the amount of grafted monomer and the amount of graft monomer used is in general from 20 to 80%.

Rubbers based on acrylates, which can be used according to the invention, are described in, for example, DE-A-No24 44 584 and DE-A-No. 27 26 256.

The rubbers (D) preferably have a glass transition temperature of less than $-30°$ C., in particular less than $-40°$ C., which leads to good impact strength even at low temperatures.

Blends of the abovementioned types of rubbers can of course also be used.

In addition to components (A) to (D), the novel molding materials may contain conventional additives and processing assistants. The amount of these is in general not more than 60, preferably not more than 50, % by weight, based on the total weight of components (A) to (C).

Examples of conventional additives are stabilizers and antioxidants, heat stabilizers and UV stabilizers, lubricants and mold release agents, colorants, such as dyes and pigments, fibrous and powdered fillers and reinforcing agents, nucleating agents and plasticizers.

Antioxidants and heat stabilizers which may be added to the thermoplastic materials according to the invention are, for example, halides of metals of group I of the Periodic Table, for example sodium, potassium and lithium halides, if necessary in combination with copper(I) halides, eg. chlorides, bromides or iodides. Sterically hindered phenols, hydroquinones, substituted members of this group and mixtures of these compounds, preferably in concentrations of not more than 1% by weight, based on the weight of the mixture, are also suitable.

Examples of UV stabilizers are various substituted resorcinols, salicylates, benzotriazoles and benzophenones, which are used in general in amounts of not more than 2.0% by weight.

Lubricants and mold release agents, which as a rule are added to the thermoplastic material in amounts of not more than 1% by weight, are stearic acids, stearyl alcohol, stearates (alkyl esters) and stearamides, as well as the esters of pentaerythritol with long-chain fatty acids.

Organic dyes, such as nigrosine, and pigments, eg. titanium dioxide, cadmium sulfide, cadmium sulfide selenide, phthalocyanines, ultramarine blue or carbon black, may also be added. Furthermore, the novel molding materials may contain fibrous and powdered fillers and reinforcing agents, such as carbon fibers, glass fibers, amorphous silica, calcium silicate, calcium metasilicate, magnesium carbonate, kaolin, chalk, powdered quartz, mica and feldspar, in amounts of not more than 50% by weight, based on components (A) to (D). Nucleating agents, such as talc, calcium fluoride, sodium phenylphosphinate, alumina or finely divided polytetrafluoroethylene, can be used in amounts of, for example, not more than 5% by weight, based on components (A) to (D).

The novel thermoplastic molding materials can be prepared by mixing components (A, (B) and (C) and, if required, additives, and mixing the elastomers (rubbers) (D) into the molten mixture of polyester and polycarbonate in a conventional mixing apparatus, such as a screw extruder, a Brabender mill or a Banbury mill. The melt can then be extruded and the extrudates cooled and comminuted. The mixing temperatures are as a rule from 240° to 280° C..

The novel molding materials are useful for the production of heat-stable impact-resistant molding materials, capable of withstanding high loads and suitable for all industrial purposes, by the injection molding or extrusion method.

They have a particularly pale natural color and good low-temperature impact strength coupled with good heat distortion resistance.

EXAMPLES 1 TO 17

The following components were used for the preparation of novel molding materials:

Component A/1
 Polyethylene terephthalate having a relative viscosity of 1.38 (0.5% strength by weight solution in 1:1 phenol/o-dichlorobenzene at 25° C.).

Component A/2
 Polybutylene terephthalate having a relative viscosity of 1.6 (determined as in A/1).

Component B
 Polycarbonate based on bisphenol A and having a relative viscosity of 1.36 (0.5% strength by weight in dichloromethane at 25° C.).

Component $C_1/1$
 Dodecylsulfonic acid, $n-C_{12}H_{25}SO_3H$

Component $C_1/2$
 Nonyl hydrogen sulfate, $n-C_9H_{19}OSO_3H$

Component $C_1/3$
 $n-C_{12}H_{25}(OCH_2-CH_2)_6-OSO_3H$

Component C₁/4
Diisobutylnaphthalene-1-sulfonic acid

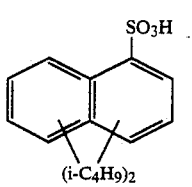

Component C₁/5

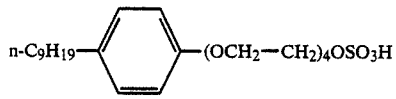

Component D/1
Copolymer of ethylene/n-butyl acrylate/acrylic acid (weight ratio 66:30:4) having a glass transition temperature of −42° C. and a melt flow index (190° C./2.16 kg load) of 15 g/10 min.

Component D/2
Copolymer of ethylene/n-butyl acrylate/glycidyl methacrylate (weight ratio 67:30:3) having a glass transition temperature of −48° C. and a melt flow index (190° C./2.16 kg) of 10 g/10 min.

Component D/3
Graft rubber which has a grafting base (75% by weight) consisting of crosslinked n-butyl acrylate and a grafted shell (25% by weight) consisting of styrene and acrylonitrile in a weight ratio of 75:25 (prepared by the process described in DE No. 24 44 584).

Component D/4
Graft rubber which has a grafting base (70% by weight) consisting of crosslinked polybutadiene, 8% by weight of a first grafted shell consisting of styrene and 22% by weight of a second grafted shell consisting of methyl methacrylate, having a glass transition temperature of −78° C.

Preparation of the molding materials
Components (A) to (D) were mixed thoroughly, melted in a twin-screw extruder at 270° C. and homogenized, and the melt was extruded into a water bath. After granulation and drying, the molding materials were converted to test specimens on an injection molding machine and tested without aftertreatment.

The results of the notched impact strength measurements according to DIN 53,453 and the determination of the Vicat B temperature according to DIN 53,460 are shown in the Table below.

The results show that the molding materials according to the invention have a very good notched impact strength, even at low temperatures, and a white color.

TABLE

| No. | Component (parts by weight) | | | | Color | Notched impact strength (kJ/m²) | |
| | A | B | C₁ | D | | 20° C. | −40° C. |
| --- | --- | --- | --- | --- | --- | --- | --- |
| 1V | 40 A/2 | 50 | | 10 D/3 | yellow | 53 | 4 |
| 2V | 40 A/1 | 50 | | 10 D/3 | pale yellow | 50 | 4 |
| 3V | 20 A/1 + 20 A/2 | 50 | | 10 D/3 | yellow | 55 | 5 |
| 4V | 40 A/2 | 50 | 0.1 stearic acid | 10 D/2 | deep yellow | 10 | 1 |
| 5 | 40 A/2 | 50 | 0.1 C₁/1 | 10 D/3 | white | 57 | 8 |
| 6 | 40 A/2 | 50 | 0.09 C₁/1 | 10 D/4 | white | 60 | 10 |
| 7 | 40 A/2 | 50 | 0.1 C₁/1 | 10 D/2 | white | 55 | 8 |
| 8 | 20 A/1 + 20 A/2 | 50 | 0.1 C₁/2 | 10 D/3 | white | 54 | 7 |
| 9 | 40 A/1 | 50 | 0.09 C₁/1 | 10 D/4 | white | 61 | 11 |
| 10 | 40 A/1 | 50 | 0.01 C₁/1 | 10 D/2 | white | 57 | 9 |
| 11 | 40 A/2 | 50 | 0.05 C₁/3 | 10 D/1 | white | 58 | 10 |
| 12 | 30 A/2 | 60 | 0.03 C₁/4 | 10 D/2 | white | 60 | 12 |
| 13 | 40 A/2 | 50 | 0.08 C₁/5 | 10 D/3 | white | 55 | 7 |
| 14V | 50 A/2 | 50 | — | — | yellow | 3 | 3 |
| 15V | 50 A/1 | 50 | — | — | yellow | 3 | 2 |
| 16 | 50 A/2 | 50 | 0.1 C₁/1 | — | white | 7 | 5 |
| 17 | 50 A/1 | 50 | 0.05 C₁/1 | — | white | 7 | 4 |

EXAMPLES 18 TO 37

The following components were used for the preparation of the novel molding materials: Components (A), (B) and (D) correspond to the components used in Examples 1 to 17.

Component C₂/1
Sulfonated EPDM rubber consisting of ethylene, propylene and norbornadiene in a weight ratio of 70:23:7, having a weight average molecular weight $\bar{M}_w$ of 50,000 and containing on average 14 sulfo groups per mole of polymer.

Component C₂/2
Sulfonated polystyrene ($\bar{M}_w$ 100,000) containing on average 85 sulfo groups per mole of polymer.

Component C₂/3
Polysulfone based on bisphenol A (2,2′-di-(4-hydroxyphenyl)-propane) and 4,4′-dihydroxydiphenyl sulfone, containing 2% by weight of 4,4′-dihydroxydiphenyl sulfone sulfonated in the nucleus (with an average of one sulfo group per molecule) and having a molecular weight $\bar{M}_w$ of 8000.

Component C₂/4
Graft copolymer prepared in a conventional manner and consisting of a core of 70% by weight of butadiene, a first shell of 10% by weight of styrene and a second shell of 6% by weight of methyl methacrylate, 2% by weight of n-butyl acrylate and 2% by weight of 2-sulfoethyl methacrylate.

Preparation of the molding materials
Components (A) to (C) were mixed thoroughly, melted in a twin-screw extruder at 270° C. and homogenized, and the melt was extruded into a water bath. After granulation and drying, the molding materials were converted to test specimens on an injection molding machine and tested without aftertreatment.

The results of the notched impact strength measurements according to DIN 53,453 and the determination of the Vicat B temperature according to DIN 53,460 are shown in the Table below.

The results show that the novel molding materials have a very good notched impact strength, even at low temperatures, and a white color.

TABLE

| Example no. | Component (% by weight) A | B | C | D | Notched impact strength DIN 53,735 (kJ/m²) 23° C. | −40° C. | Color | Vicat B DIN 53,460 °C. |
|---|---|---|---|---|---|---|---|---|
| 18V | 40 A/2 | 50 | — | 10 D/3 | 53 | 4 | yellow | 81 |
| 19V | 40 A/1 | 50 | — | 10 D/3 | 50 | 4 | pale yellow | 79 |
| 20V | 20 A/1 + 20 A/2 | 50 | — | 10 D/2 | 55 | 5 | yellow | 80 |
| 21 | 40 A/2 | 50 | 1 C$_2$/2 | 9 D/2 | 54 | 10 | white | 120 |
| 22 | 38 A/2 | 47.5 | 5 C$_2$/3 | 9.5 D/2 | 55 | 10 | white | 125 |
| 23 | 40 A/2 | 50 | 1 C$_2$/2 | 9 D/3 | 54 | 8 | white | 122 |
| 24 | 20 A/1 + 20 A/2 | 50 | 1 C$_2$/2 | 9 D/2 | 57 | 9 | white | 122 |
| 25 | 40 A/1 | 50 | 0.5 C$_2$/2 | 9.5 D/3 | 55 | 7 | white | 136 |
| 26 | 20 A/1 | 50 | 0.3 C$_2$/2 | 9.7 D/2 | 60 | 15 | white | 138 |
| 27 | 28.8 A/1 | 48.5 | 3.0 C$_2$/3 | 9.7 D/3 | 58 | 12 | white | 137 |
| 28V | 40 A/2 | 50 | — | 10 D/4 | 55 | 7 | yellow | 80 |
| 29V | 40 A/1 | 50 | — | 10 D/4 | 54 | 7 | pale yellow | 83 |
| 30V | 40 A/2 | 50 | — | 10 D/4 | 50 | 4 | yellow | 82 |
| 31 | 40 A/2 | 50 | 10 C$_2$/4 | — | 60 | 12 | white | 82 |
| 32 | 40 A/2 | 50 | 10 C$_2$/1 | 5 D/2 | 58 | 10 | white | 122 |
| 33 | 40 A/2 | 50 | 5 C$_2$/1 | 5 D/2 | 58 | 10 | white | 120 |
| 34 | 40 A/1 | 50 | 10 C$_2$/4 | — | 58 | 12 | white | 135 |
| 35 | 40 A/1 | 50 | 10 C$_2$/1 | — | 61 | 9 | white | 137 |
| 36 | 20 A/1 + 20 A/2 | 50 | 10 C$_2$/4 | — | 60 | 13 | white | 120 |
| 37 | 20 A/1 | 70 | 5 C$_2$/1 | 5 D/2 | 62 | 16 | white | 138 |

Examples designated by V are Comparative Examples

We claim:

1. A thermoplastic molding material, consisting essentially of:
   ((A) from 10 to 89.99% by weight of a polyester,
   (B) from 10 to 89.99% by weight of a polycarbonate; and at least one member selected form the group consisting of (C$_1$) and (C$_2$) wherein
   (C$_1$) is from 0.01 to 1% by weight of a low molecular weight organic compound of not more than 70 carbon atoms which contain —SO$_3$H groups;
   (C$_2$) is from 0.01 to 30% by weight of a polymer containing sulfo groups, and having a weight average molecular weight of not less than 1000; and
   ((D) from 0 to 30% by weight of a rubber impact modifier.

2. The thermoplastic molding material of claim 1, wherein component (C$_1$) is at least one member selected from the group consisting of sulfonic acids, organic sulfonic acid half esters, and mixtures thereof.

3. The thermoplastic molding material of claim 2, wherein said sulfonic acid is at least one member selected from C$_9$–C$_{22}$-alkyl sulfonic acids, unsaturated C$_9$–C$_{22}$-alkene sulfonic acids, C$_8$–C$_{25}$-hydroxy alkene sulfonic acids, C$_6$–C$_{15}$-perfluoro alkene sulfonic acids, C$_1$–C$_{25}$-alkyl benzene sulfonic acids, C$_1$–C$_{25}$-alkyl naphthalene sulfonic acids, and mixtures thereof.

4. The thermoplastic molding material of claim 2, wherein said sulfonic acid is at least one member selected from the group consisting of decyl sulfonic acid, dodecyl sulfonic acid, octadecyl sulfonic acid, sulfonated linolenic acid, perfluoro octane sulfonic acid, derivatives of sulfosuccinic acid, diisobutyl naphthalene-1-sulfonic acids.

n—C$_{12}$H$_{25}$—(O—CH$_2$—CH$_2$)$_6$13 SO$_3$H, and

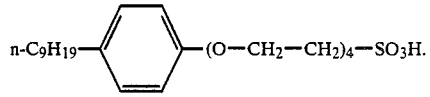

5. The thermoplastic molding material of claim 2, wherein component (C$_1$) is at least one member selected from the group consisting of C$_5$–C$_{30}$-alkyl hydrogen sulfates, C$_5$–C$_{30}$-alkenyl hydrogen sulfates, oligo ethylene oxide hydrogen sulfates containing from 2 to 20 ethylene oxide units, oligo-hydrogen sulfates containing from 2 to 12 butan-1,4-diol units, unsubstituted of C$_1$–C$_{12}$-alkyl substituted aryl hydrogen sulfates which are obtained by esterification of sulfuric acid with alcohols or phenols which may have up to ten –(O—CH$_2$—CH$_2$)– units in the chain and mixtures thereof.

6. The thermoplastic molding material of claim 5, wherein component (C$_1$) is at least one member selected from the group consisting of butyl hydrogen sulfate, ethylhexyl hydrogen sulfate, hexadecen-1-ol hydrogen sulfate, C$_{15}$H$_{31}$—(O—CH$_2$—CH$_2$)$_3$—OSO$_3$H, C$_{12}$H$_{25}$—(O—CH$_2$—CH$_2$—CH$_2$—CH$_2$)$_2$—OSO$_3$H, isooctylphenol hydrogen sulfate, C$_9$H$_{13}$—C$_6$H$_4$—(OCH$_2$CH$_2$)$_4$—OSO$_3$H, and mixtures thereof.

7. The thermoplastic molding material of claim 5, wherein component (C$_1$) is at least one member selected from the group consisting of nonyl hydrogensulfate, n—C$_{12}$H$_{25}$(—O—CH$_2$—CH$_2$)$_6$—OSO$_3$H,

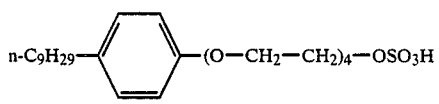

and mixtures thereof.

8. The thermoplastic molding material of claim 1 wherein component (C$_2$) is at least one member selected from the group consisting of sulfonated polystyrene, sulfonated rubbers, sulfonated polycondensates, and mixtures thereof.

9. The thermoplastic molding material of claim 8, wherein component (C$_2$) is at least one member selected from the group consisting of sulfonated EPDM rubbers, sulfonated polystyrenes, sulfonated polysulfones based on Bisphenol A and 4,4'-dihydroxydiphenylsulfone, and mixtures thereof.

10. The thermoplastic molding material of claim 1 wherein the amount of component (D) is of from 2 to 25% by weight.

11. The thermoplastic molding material of claim 10, wherein the amount of component (D) is of from 5 to 15% by weight.

12. A molded article obtained from a thermoplastic molding material which consists essentially of:
(A) from 10 to 89.99% by weight of a polyester;
(B) from 10 to 89.99% by weight of a polycarbonate;
(C$_1$) from 0.01 to 1% by weight of a low molecular weight organic compound of nor more than 70 carbon atoms which contains —SO$_3$H groups;
(C$_2$) from 0.01 to 30% by weight of a polymer containing sulfo groups, and having a weight average molecular weight of not less than 1000; and
(D) from 0 to 30% by weight of a rubber impact modifier.

13. The molded article of claim 12, wherein component (C$_1$) is at least one member selected from the group consisting of sulfonic acids, organic sulfonic acid half esters, and mixtures thereof.

14. The molded article of claim 13, wherein said sulfonic acid is at least one member selected from the group consisting of C$_9$–C$_{22}$-alkyl sulfonic acids, unsaturated C$_9$–C$_{22}$-alkene sulfonic acids, C$_8$–C$_{25}$-hydroxy alkene sulfonic acids, C$_6$–C$_{15}$-perfluoro alkene sulfonic acids, C$_1$–C$_{25}$-alkyl benzene sulfonic acids, C$_1$–C$_{25}$-alkyl naphthalene sulfonic acids, and mixtures thereof.

15. The molded article of claim 13, wherein said sulfonic acid is at least one member selected from the group consisting of decyl sulfonic acid, dodecyl sulfonic acid, octadecyl sulfonic acid, sulfonated linolenic acid, perfluoro octane sulfonic acid, derivatives of sulfosuccinic acid, diisobutyl naphthalene-1-sulfonic acids,

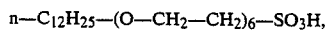

and

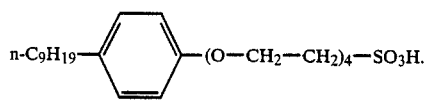

16. The molded article of claim 13, wherein component (C$_1$) is at least one member selected from the group consisting of C$_5$–C$_{30}$-alkyl hydrogen sulfates, C$_5$–C$_{30}$-alkenyl hydrogen sulfates, oligo ethylene oxide hydrogen sulfates containing from 2 to 20 ethylene oxide units, oligo-hydrogen sulfates containing from 2 to 12 butan-1,4-diol units, unsubstituted or C$_1$–C$_{12}$-alkyl substituted aryl hydrogen sulfates and hydrogen sulfates which are obtained by esterification of sulfuric acid with alcohols or phenols which may have up to ten —(O—CH$_2$—CH$_2$)— units in the chain or mixtures thereof.

17. The molded article of claim 16, wherein component (C$_1$) is at least selected from the group consisting of butyl hydrogen sulfate, ethylhexyl hydrogen sulfate, hexadecen-1-ol hydrogen sulfate, C$_{15}$H$_{31}$—(O—CH$_2$—CH$_2$)$_3$—OSO$_3$H, C$_{12}$H$_{25}$—(O—CH$_2$—CH$_2$—CH$_2$—CH$_2$)$_2$—OSO$_3$H, isooctylphenol hydrogen sulfate, C$_9$H$_{13}$—C$_6$H$_4$—(OCH$_2$CH$_2$)$_4$—OSO$_3$H or mixtures thereof.

18. The molded article of claim 16, wherein component (C$_1$) is at least one member selected from the group consisting of nonyl hydrogensulfate, n—C$_{12}$H$_{25}$(—O—CH$_2$—CH$_2$)$_6$OSO$_3$H,

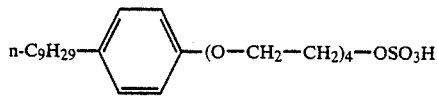

and mixtures thereof.

19. The molded article of claim 12, wherein component (C$_2$) is at least one member selected from the group consisting of sulfonated polystyrene, sulfonated rubbers, sulfonated polycondensates, and mixtures thereof.

20. The molded article of claim 19, wherein component C$_2$) is at least one member selected from the group consisting of sulfonated EPDM rubbers, sulfonated polystyrenes, sulfonated polysulfones based on Bisphenol A and 4,4'-dihydroxydiphenylsulfone, and mixtures thereof.

21. The molded article of claim 12, wherein the amount of component (D) is of from 2 to 25% by weight.

22. The molded article of claim 21, wherein the amount of component (D) is of from 5 to 15% by weight.

* * * * *